Patented Dec. 6, 1927.

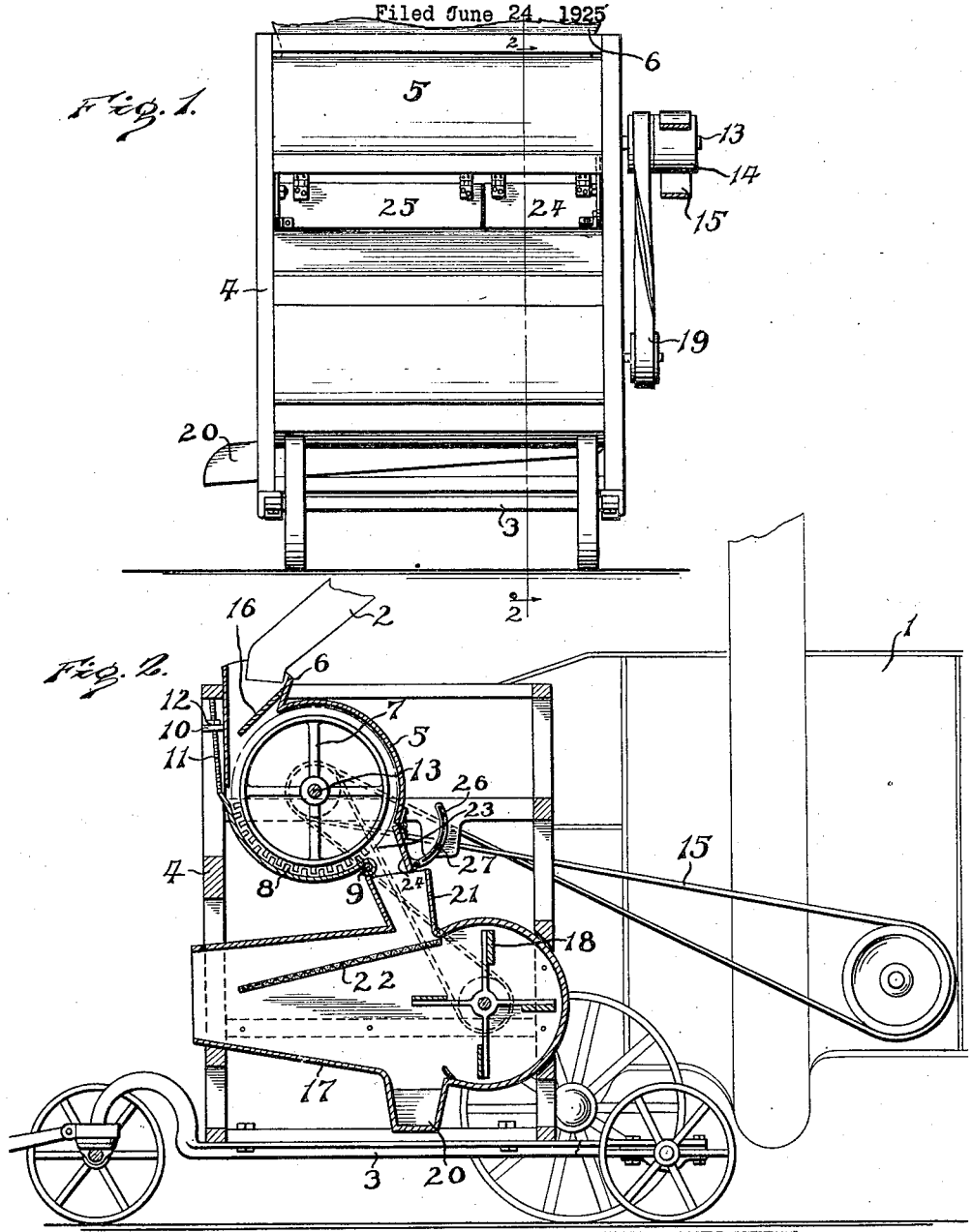

1,651,641

UNITED STATES PATENT OFFICE.

WILLIAM B. SPURR, OF SCOTTSBLUFF, NEBRASKA.

SEED HULLER.

Application filed June 24, 1925. Serial No. 39,319.

This invention relates to seed hullers and has particular reference to means for cleaning small seeds, such as alfalfa and sweet clover, one object of the invention being the provision of a mechanism which may be readily transported from point to point and which may be set up in connection with a grain separator so as to receive the seeds from the separator and be driven from the latter. A particular object of the invention is to provide simple means whereby the progress of the seed through the machine will be retarded so that the hulls will be effectually separated therefrom. The invention is illustrated in the accompanying drawing and will be hereinafter fully set forth.

In the drawing:

Figure 1 is an end elevation of a seed huller embodying my invention, and

Fig. 2 is a vertical longitudinal section of the same showing it in operative relation to a portion of a grain separator.

In the drawing, the reference numeral 1 indicates a portion of a threshing machine or grain separator which is indicated conventionally and is provided with a delivery spout 2 arranged ordinarily to deliver seed into a receptacle in which they are stored until an opportunity is had to discharge them into a cleaner. According to my invention, there is provided a truck 3 of any convenient form which may be easily drawn into a position adjacent the delivery end of the grain separator 1, and upon this truck is mounted a frame 4 carrying the seed huller. In the upper portion of the frame 4 is mounted a casing 5 of a general cylindrical form and on the upper side of this casing is a hopper 6 adapted to be disposed immediately under the spout 2 of the grain separator so that the seed will be delivered directly into the hopper. Disposed concentrically within the casing 5 is a hulling cylinder 7 cooperating with a concave 8 which forms the lower side of the casing 5 around the cylinder and is pivotally mounted, as indicated at 9. Upon the side of the hopper 6 is a bracket 10 in which is threaded an adjusting rod 11 attached to the concave 8 so that by proper manipulation of the nut 12 upon the said rod the concave may be set closer to or farther from the hulling cylinder and the mechanism thus adjusted to the size of the seed delivered to the apparatus. The cylinder shaft 13 is extended through one side of the casing 5 and equipped with a pulley 14 receiving power from the grain separator through a belt 15 in an obvious manner. A check plate 16 is secured within the hopper 6 and extends across the same but is inclined downwardly, as clearly shown in Fig. 2, so that, while the flow of seed to the hulling cylinder will be retarded and choking of the cylinder will be avoided, the seed may flow in a continuous steady stream to the hulling cylinder.

Below the casing 5 is a casing 17, in one end of which is mounted a fan or blower 18 which is driven from the shaft 13 through suitable pulleys and a belt 19, as will be readily understood. In the bottom of the casing 17 is a discharge chute 20 whereby the cleaned hulled seed may be delivered into any convenient receptacle, and in the upper side of the said casing 17 is a hopper 21 which is so arranged as to receive the seed directly from the casing 5, a screen 22 being disposed within the casing 17 immediately below the bottom of the hopper 21 so that the seed will be separated from the hulls and other waste matter, the seed dropping to the chute 20 and the hulls and impurities being driven out through the action of the fan blast. An exit or discharge opening 23 is provided in the casing 5 in substantial vertical alinement with the hopper 21, and this exit may be closed by doors 24 and 25. The said doors are hinged at their upper edges to the casing 5 at the upper side of the exit and may swing towards or from the threshing cylinder so as to entirely close the exit or partially uncover it to a desired degree. It will be noted that the door 24 is appreciably smaller than the door 25. If the seed passing through the machine is very fine, the door 25 may be kept closed and the door 24 partially opened, the result being that the seed will be caused to travel across the machine as well as partially around the hulling cylinder between the latter and the concave 8 and, therefore, the seed will be retained within the casing 5 for a period sufficient to permit all the hulls to be removed from the seed. Each door is provided with a bracket or slotted arm 26 through which a securing bolt 27 is passed into an adjacent portion of the frame 4 so that the door may be easily secured in a set position, as will be understood.

By the use of my machine, the seed which is separated from the straw in the threshing machine or the grain separator is delivered at once into the hopper 6 and flows to the hulling cylinder and between the same and the concave where it will be acted upon by the teeth or projections of the cylinder and the concave so that the hulls will be thoroughly split or broken and removed from the seed. The seed and the hulls will, of course, flow through the exit of the cylinder casing and pass through the hopper 21 onto the screen 22 where the hulls will be separated from the seed, as before stated. My machine not only saves the time which has heretofore been required to collect the seeds and then deliver them to a seed-cleaning apparatus removed from the grain separator but also operates to remove the hulls more efficiently than has been heretofore done. In devices heretofore provided for hulling seed, there was no means for preventing the seed flowing through the machine so rapidly that the hulls would not be removed, but I have overcome this objection by providing the doors 24 and 25 which can be set to very effectually retard the escape of the seed and, consequently, will hold the seed in the hulling casing for a sufficient period to permit the hulling cylinder to act upon the entire body of seed and separate the hulls therefrom. The apparatus is exceedingly simple and has been found to operate in a highly efficient manner.

Having thus described the invention, I claim:

In an apparatus of the character described, a cylinder, a casing around the upper and rear portions of said cylinder and having an inlet in its upper portion, a concave below said cylinder having its rear end spaced from said casing to provide an outlet in the lower rear portion thereof, a separator having an upwardly extending inlet hopper disposed beneath the outlet of said casing, doors for the outlet having their upper edge portions hinged to the lower rear edge portion of said casing and adapted to be swung rearwardly from a closed to an open position above said hopper and constitute deflectors to direct seed into the hopper when open, and means to releasably secure said doors in an adjusted position.

In testimony whereof I affix my signature.

WILLIAM B. SPURR. [L. S.]